United States Patent [19]

Kimata et al.

[11] 4,153,018

[45] May 8, 1979

[54] AIR FLOW MEASURING DEVICE FOR INTERNAL COMBUSTION ENGINES

[75] Inventors: Kei Kimata, Aichi; Tsugito Nakazeki, Iwata; Yoshinobu Yasuda, Iwata, all of Japan

[73] Assignee: NTN Toyo Bearing Co. Ltd., Osaka, Japan

[21] Appl. No.: 710,126

[22] Filed: Jul. 30, 1976

[30] Foreign Application Priority Data

Jul. 31, 1975 [JP] Japan .................................. 50-93972
Sep. 2, 1975 [JP] Japan .................................. 50-106795

[51] Int. Cl.[2] ........................ F02D 11/08; F16K 31/12

[52] U.S. Cl. .............................. 123/103 R; 261/50 A; 137/489; 123/103 B

[58] Field of Search ........... 123/103 R, 103 B, 103 E, 123/139 AW; 261/50 A, 50 AA; 137/82, 468, 489

[56] References Cited

U.S. PATENT DOCUMENTS

| | | | |
|---|---|---|---|
| 2,668,697 | 2/1954 | Sager | 137/468 |
| 3,047,010 | 7/1962 | Rothfuss | 137/489 |
| 3,460,520 | 8/1969 | Huber | 123/139 AW |
| 3,650,258 | 3/1972 | Jackson | 261/50 A |
| 3,769,998 | 11/1973 | Avant | 137/489 |
| 3,852,381 | 12/1974 | Mick | 261/50 A |
| 3,861,366 | 1/1975 | Masaki et al. | 123/139 AW |

*Primary Examiner*—Charles J. Myhre
*Assistant Examiner*—Craig R. Feinberg
*Attorney, Agent, or Firm*—Hall & Houghton

[57] ABSTRACT

An air/fuel ratio compensating device is provided for association with an internal combustion engine having a fuel control valve, air suction pipe means and pedal accelerator means, the compensating device including an area flow metal system made up of a flow detection valve positioned upstream in the air suction pipe means and operatively associated with the fuel control valve, a flow control valve positioned downstream in the air suction pipe means in series with the flow detection valve and being operatively connected to the accelerator pedal means, the area flow meter system enabling the difference in pressure existing on opposite sides of the flow detection valve to be maintained at a predetermined value to insure that the amount of air flow is proportional to the opening area of the flow detection valve thus permitting a determination of the amount of air flow on the basis of the opened area of the flow detection valve, a feedback control mechanism for controlling the area control flow meter and including pressure sensitive amplifier means to detect and amplify the deviation of the difference in pressure, valve opening means connected to the amplifier means and operatively associated with the flow detecting valve for opening and closing the flow detection valve by the output from the amplifier means, and compensating means for compensating for the set value placed in the pressure sensitive amplifier means according to the operating conditions of the internal combustion engine.

3 Claims, 9 Drawing Figures

P1
P2
A
B
C
PA
PB
PC
P
Pressure
Position
1
2
3
4
5
6
7
8
9
10
11
12
13
14
15
16
17
18
19
39
42
43
44
46
47

AIR FLOW MEASURING DEVICE FOR INTERNAL COMBUSTION ENGINES

RELATED APPLICATION

This application is related to application Ser. No. 710,127, filed July 30, 1976.

BACKGROUND OF THE INVENTION (a) Field of the Invention

The present invention relates to an air-fuel ratio compensating device for internal combustion engines, and more particularly it relates to a compensation device incorporated in a flow measuring device arranged so that in order to accurately control the ratio of suction air to fuel so as to keep it at a constant value, the difference in the pressures existing on opposite sides of an air throttle valve placed in a suction pipe is kept at a constant value by a feedback control device, the amount of incoming air being determined by the opening area of said throttle valve.

Further, the invention relates to a fluid type or mechanical type compensation device which does not make it necessary to remodel said flow measuring device.

(b) Description of the Prior Art

In internal combustion engines, e.g., for automobiles, it is particularly important to engine efficiency and exhaust gas countermeasure to accurately control the weight ratio of suction air to fuel so as to keep it at a constant value. To this end, a high precision measuring device for measuring the amount of suction air is required. Generally, the conventional suction air flow measuring device for this purpose comprises a flow control valve interlocked to an accelerator pedal and placed in an air suction pipe, a flow detection valve interlocked to a fuel control mechanism and placed upstream of said flow control valve, said two valves defining an intermediate chamber, the pressure in said intermediate chamber being controlled by the opening and closing of the upstream valve so as to keep constant the difference in the pressures existing on opposite sides of said flow detection valve, so that the amount of suction air is proportional to the opening area of the flow detection valve, the amount of flow of air being thus determined by said opening area. The so-called area flowmeter system is known. The control of the pressure control valve in this system is performed by employing a pressure difference control servo-mechanism based on the feedback system wherein when the difference in the pressures existing on opposite sides of the valve is deviated from a predetermined value, the deviation is detected by the pressure difference setting diaphragm of the servo-mechanism, the detected value being then amplified by a fluid mechanism, the resulting amplified output being used to increase or decrease the degree of opening of the flow detection valve so as to bring said pressure difference to said predetermined value. Since incoming air varies in its specific weight with its temperature and pressure, a pressure difference compensating mechanism is incorporated so as to measure the amount of flow of air accurately.

While the air-fuel ratio provided by the above mechanism is appropriate during normal operation of the engine, often there arises the need of changing the air-fuel ratio so as to increase the same when the engine is at full throttle or the engine temperature is low. Thus, the above device is not appropriate.

SUMMARY OF THE INVENTION

The present invention relates to an air-fuel ratio compensating device for internal combustion engines, comprising a flow detection valve and a flow control valve which are placed in series with each other in a channel, said flow detection valve being interlocked to a fuel control valve, an area flowmeter for keeping constant the difference in the pressures existing on opposite sides of the flow detection valve and determining the amount of inflow by the opening area thereof, a feedback control mechanism consisting of a pressure-sensitive amplifier mechanism for detecting and amplifying the deviation of the pressure difference by means of a pressure difference setting diaphragm, and a valve opening mechanism for controlling the opening and closing of the flow detection valve by the output from said pressure-sensitive amplifier mechanism, and compensation mechanism whereby the set value put in said pressure difference setting diaphragm is compensated according to the operating conditions of an internal combustion engine.

Further, the invention is intended to compensate for the fluid pressures acting on opposite surfaces of the pressure difference setting diaphragm according to the operating conditions of an engine.

FEATURES OF THE INVENTION

According to the invention, since the air-fuel ratio compensating mechanism for making the difference in the pressures on opposite sides of the air throttle valve smaller than the set pressure difference of the servo-mechanism so as to decrease the amount of flow of air to increase the fuel proportion relative to the air is incorporated in the pressure difference control servo-mechanism, the air-fuel ratio is automatically varied toward more fuel when the engine is at fuel throttle or the engine temperature is low. As a result, it become easier to increase the engine output when necessary or to start the engine. Thus, it become possible to improve the performance of this type of internal combustion engines. Further, the incorporation of the present inventive device does not necessitate substantial remodeling of the main body including the servo-mechanism since it is only necessary to vary the pressures in chambers A and B separated by the pressure difference setting diaphragm by utilizing a venturi or vary the spring force on the pressure difference setting diaphragm. Further, the air-fuel ratio can be varied as desired according to the operating conditions of the engine, and this is effective particularly for exhaust gas countermeasure.

DESCRIPTION OF THE PREFERRED EMBODIMENTS

First of all, the outline of the air flow measuring device for internal combustion engines which forms the background of the present invention will be described with reference to FIG. 1.

Figure 1:
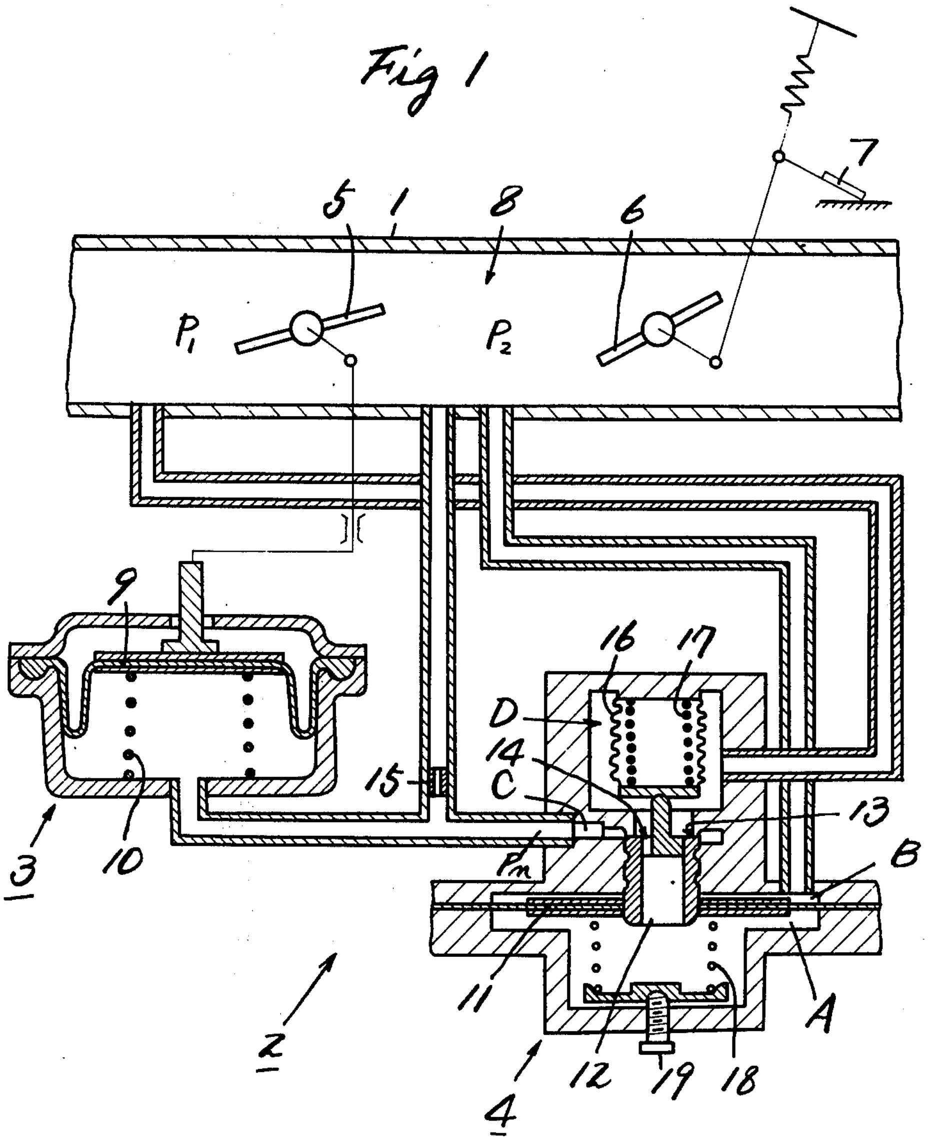
FIG. 1 is a view explanatory of the air flow measuring device for internal combustion engines developed by the applicant and forming the background of the present invention.

In FIG. 1, 1 designates the suction air pipe of an engine and 2 designates a feedback control mechanism consisting of a valve opening mechanism 3 and a pressure difference control servo-mechanism 4. An upstream valve 5 and a downstream valve 6 are placed in said air suction pipe 1, said upstream valve 5 serving as a flow detection valve and connected to the valve opening mechanism 3 and to a fuel control mechanism (not shown), said downstream valve 6 serving as a flow control valve and connected to an accelerator pedal 7. Let $P_1$ be the air pressure in the upstream valve 5 and $P_2$ be the air pressure in an intermediate chamber 8 defined between the upstream and downstream valves 5 and 6. Then, if the pressure difference $(P_1 - P_2)$ is kept constant, it follows that the amount of flow of air is proportional to the opening area of the upstream valve 5 and hence the amount of flow of air can be determined by the opening area of the valve. This is the area flowmeter system. Since the flow detection valve is interlocked to the fuel control mechanism, the ratio of suction air to fuel supplied can be kept constant if the degree of opening of the valve is proportional to the amount of supply of fuel. The difference $(P_1 - P_2)$ in the pressures on opposite sides of the flow detection valve is controlled by the feedback control mechanism 2 so that it is constant. Thus, when the pressure difference $(P_1 - P_2)$ deviates slightly from a certain value, it is the servo-mechanism 4 that detects and amplifies the deviation and it is the valve opening mechanism 3 that directly controls the opening and closing of the upstream valve 5 according to said deviation so as to correct the pressure difference $(P_1 - P_2)$ to a constant value by using the output from the servo-mechanism 4. The valve opening mechanism 3 comprises a diaphragm 9 installed in the main body through a spring 10, the movable portion of said diaphragm being connected to the upstream valve 5. The servo-mechanism 4 has chambers A and B which are separated from each other by a diaphragm 11 and chambers C and D which are separated by a variable orifice 13 whose opening area varies with the displacement of a valve 12 secured to the diaphragm 11. The chambers A and D communicate with each other through a communication hole 14 so that they are maintained under the same pressure. The chamber B communicates with the intermediate chamber 8 downstream of the upstream valve 5, while the chamber C communicates with the valve opening mechanism 3 and with the intermediate chamber 8 through a choke 15. Further, the chambers A and D communicate with the upstream side of the upstream valve 5 so that they are at the pressure $P_1$. The chamber B is at the pressure $P_2$. The deviation of the pressure difference $(P_1 - P_2)$ is detected in terms of the displacement of the pressure difference setting diaphragm 11. The above-described construction of the amplifier mechanism 4 is designed principally for detecting the deviation of the pressure difference $(P_1 - P_2)$, and the compensation for the temperature and pressure of the air is made by a bellows 16, in which a gas at a reference temperature is enclosed so that it may have a reference pressure. One end of the bellows is in permanent contact with the valve 12 and the other end is fixed to the fixed part of the main body. Pressure difference setting springs 17 and 18 have their spring pressures adjusted so as to balance the difference in the pressure $P_1$ and $P_2$ acting on opposite sides of the diaphragm 11. The spring pressure adjustment is made by an adjusting screw 19, and in the balanced condition the variable orifice 13 is slightly open.

The principle of the operation of the above construction is as follows.

When the difference $(P_1 - P_2)$ in the pressures on opposite sides of the upstream valve 5 is slightly deviated from a predetermined value, the pressure difference setting diaphragm 11 is displaced to move the valve 12, so that the opening area of the variable orifice 13 between the chambers C and D varies and the pressure $P_n$ in the chamber C varies between $P_1$ and $P_2$. When the pressure $P_n$ in the chamber C varies as a result of the deviation of the pressure difference $(P_1 - P_2)$ as described above, the diaphragm 9 of the valve opening mechanism 3 communicating therewith is displaced and eventually the upstream valve 5 is actuated in a direction which corrects the deviation. In this case, however, if the temperature and pressure of incoming air vary, the density of the air also varies, producing an error in the air-fuel ratio. Compensation for the temperature and pressure of air is automatically made by the bellows 16. Therefore, the servo-mechanism 4 corrects errors due to temperature and pressure by the bellows 16 and also keeps constant the pressure difference $(P_1 - P_2)$ by adjusting the diaphragm 11 to a certain pressure difference set value by means of the pressure difference setting springs 17 and 18. In this way, the weight rate of suction air flow is made proportional to the opening area of the upstream valve 5 by keeping the pressure difference $(P_1 - P_2)$ constant, and if the fuel control mechanism is connected so that the supply of fuel is proportional to said opening area, the ratio of suction air to fuel can be kept constant regardless of the pressure and temperature of the atmosphere.

The air-fuel ratio provided in the manner described above is appropriate for normal operation, but when engine is at full throttle or the engine temperature is low, it is necessary to increase the amount of fuel by changing the air-fuel ratio provided by the above mechanism.

The present invention enables the above necessity to be automatically met, and to this end an air-fuel ratio compensating mechanism 20 operable when the engine is warming up or at full throttle is incorporated in the servo-mechanism 4. This will now be described in more detail.

Figure 2:
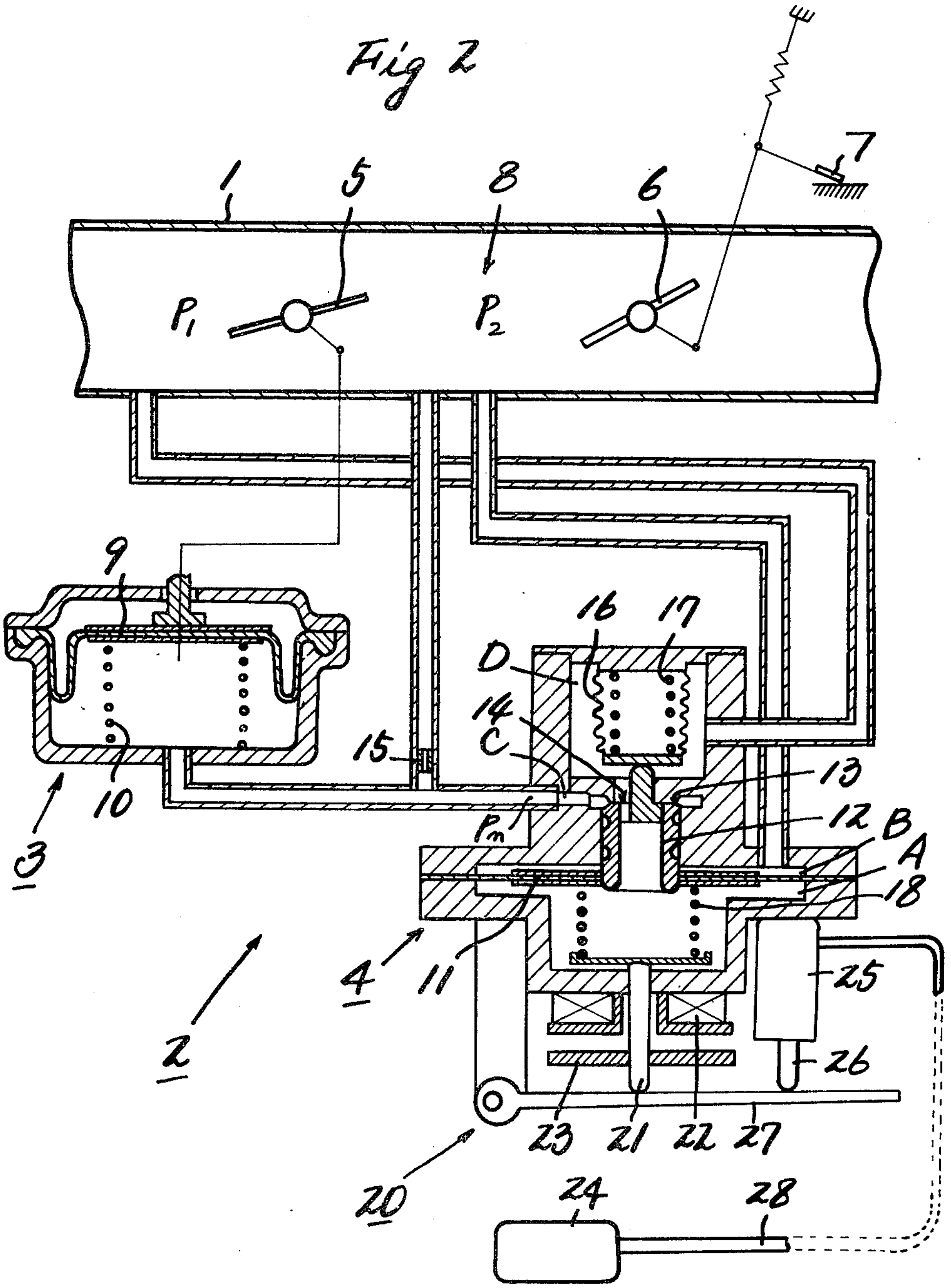
FIG. 2 is a view explanatory of a first embodiment of the invention.

FIG. 2 is a first embodiment of the invention, wherein air-fuel ratio is compensated by adjusting the spring pressure of one spring 18. Designated at 21 is a connecting bar connected to the spring 18; 22, a solenoid disposed around the intermediate region of the connecting bar 21; and 23, an iron piece fixed to the connecting bar 21. They are used when the engine is at full throttle. Designated at 24 is a temperature-sensitive member; 25, a cylinder; 26, a piston rod; and 27, a lever. The temperature-sensitive member 24 is immersed in the cooling water in a radiator (now shown) or placed adjacent thereto so that the fluid enclosed in said member is expanded or contracted in response to variations in the temperature of the cooling water, such volumetric change of the fluid acting on the cylinder 25 via a pipe 28 to extend or retract the piston rod 26. The extending or retracting movement of the piston rod 26 is transmitted to the connecting bar 21 through the lever 27. The solenoid 22, when energized in the manner to be later described, attracts the iron piece 23 to retract the connecting bar 21 toward the servo-mechanism 4 side.

The operation of the air-fuel ratio compensating mechanism described above is as follows.

An electric contact set (not shown) installed on the flow control valve or a pressure-sensitive switch (not shown) adapted to be closed when the negative pressure (absolute pressure) in the manifold becomes high is installed on the manifold, in such a manner that the solenoid 22 is energized when the engine is substantially at full throttle. Then, when the engine is substantially at full throttle, the solenoid 22 is energized to attract the iron piece 23 to push up the connecting bar 21, whereby the spring 18 is deformed to increase the spring pressure acting on the diaphragm 11. As a result, the set pressure difference value of the servo-mechanism 4 becomes lower than a predetermined value. Consequently, the valve 12 interlocked to the pressure difference setting diaphragm 11 is also displaced to decrease the opening area of the variable orifice 13, so that the pressure $P_n$ in the chamber C decreases similarly. At the same time, the pressure in the lower chamber of the valve opening mechanism 3 is decreased to cause the downward displacement of the diaphragm 9, as viewed in FIG. 2, so that the flow detection valve 5 interlocked to the diaphragm 9 is opened until it is balanced at the new set value of the pressure difference setting diaphragm. Thereby, the degree of opening of the flow detection valve 5 is increased and hence the amount of fuel to be fed by the fuel control mechanism is increased. Therefore, the amount of air relative to the amount of fuel is decreased and the engine output is thereby increased. Further, at engine start, the engine is so cool that fuel cannot be fully gasified. This time also it is necessary to increase the fuel concentration. In this case, the temperature-sensitive member 24 detects the temperature of the engine cooling water with the resulting volumetric change of the enclosed fluid as the latter thermally expands, such change being converted into an axial displacement by the piston rod 26 of the cylinder 25 through the pipe 28. In the case where the engine temperature is low, such axial displacement is converted into a displacement of the connecting bar 21 throught the lever 27 and eventually increases the spring pressure of the spring 18. At this time (when the engine temperature is low), the amount of fuel to be fed is increased in the same manner as when the engine is at full throttle, thereby facilitating engine start.

Figure 3:
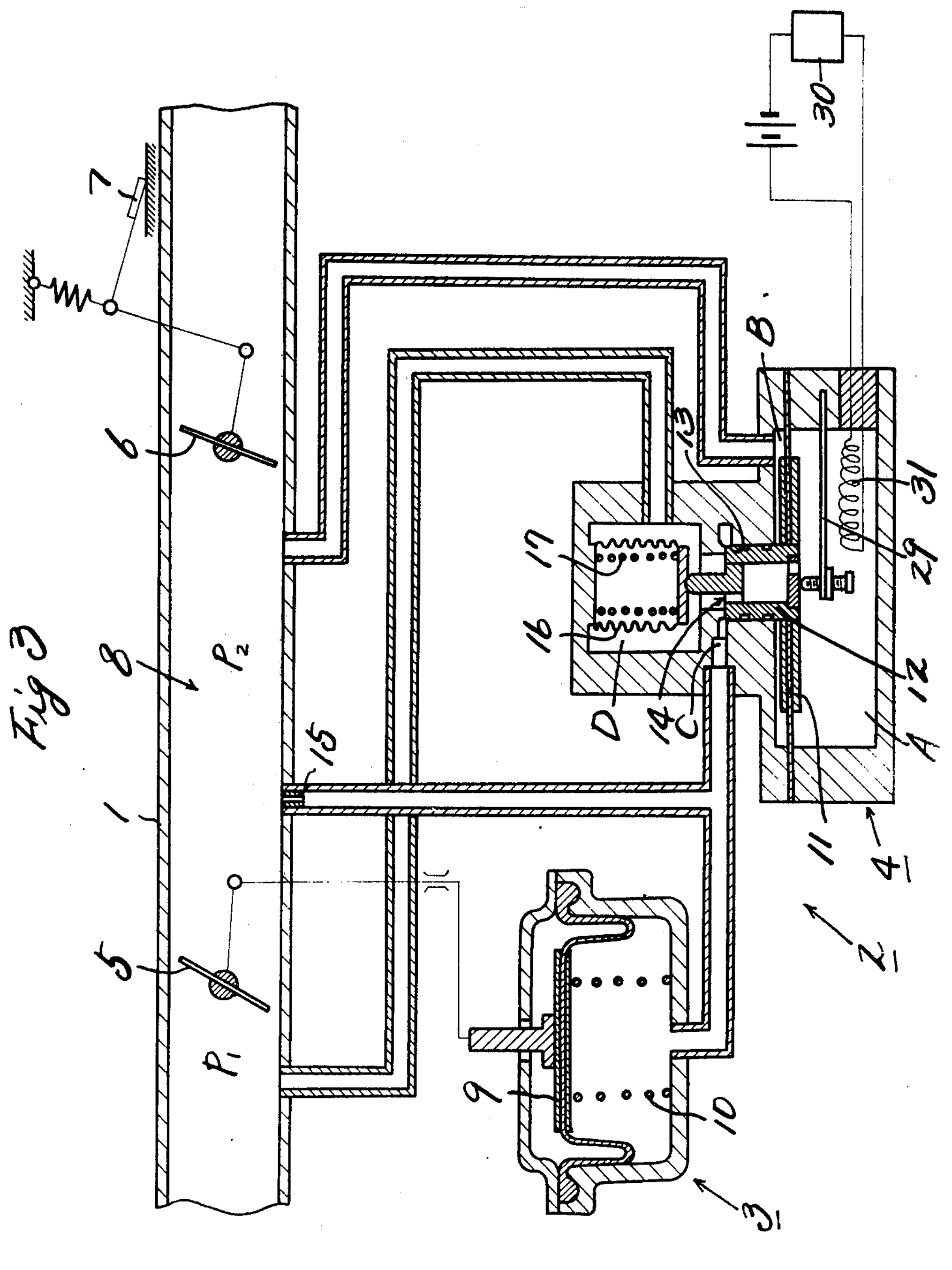
FIG. 3 shows a modification of the device shown in FIG. 2.

FIG. 3 shows the use of an elastic bimetal 29 in place of the pressure difference adjusting spring 18. The increase of the amount of fuel needed during warm-up or at full throttle is effected when a controller 30 which operates according to the operating conditions of the internal combustion engine causes the energization of a heater 31 placed adjacent the bimetal 29. The heater 31 causes the bimetal 29 to push up the pressure difference setting diaphragm 11.

In the above embodiments, the spring 18 or bimetal 29 is displaced to vary the force on the diaphragm so as to compensate air-fuel ratio. However, it is also possible to vary the spring pressure of the other spring 17 which acts on the variable orifice 13 parallelly with the bellows 16, so as to vary the force on the diaphragm 11.

Figure 4:
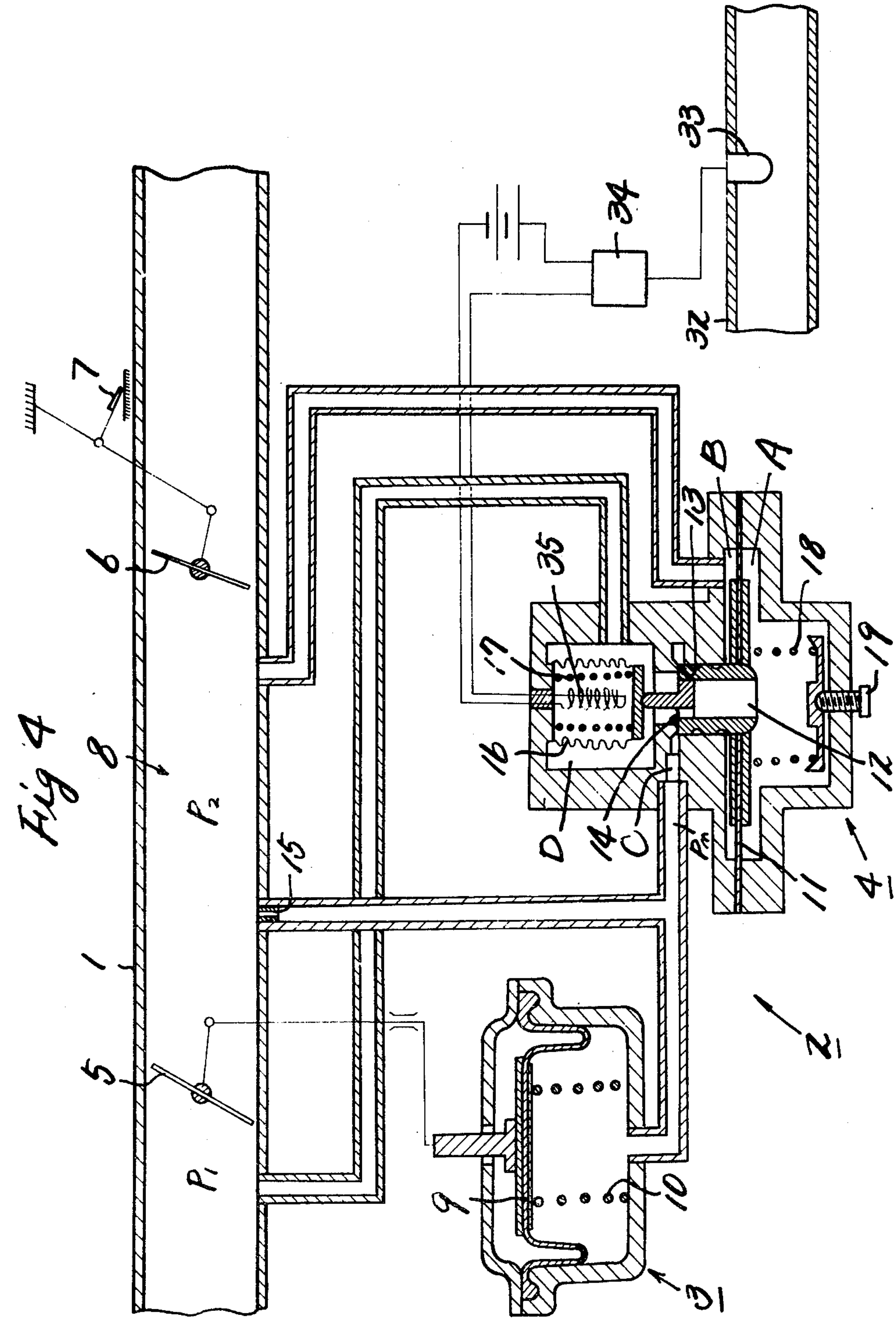
FIG. 4 is view explanatory of a second embodiment of the invention.

FIG. 4 shows a second embodiment of the invention. An exhause gas sensor 33 for detecting a component of exhaust gas is installed in an exhaust pipe 32. Designated at 34 is a controller for controlling a heater 35 placed in a bellows 16 by a signal from said sensor 33. In this case, the set value of the pressure difference setting diaphragm is preset so as to provide fuel-rich gas, the air-fuel ratio is controlled by energizing the heater 35 so as to provide the theoretical air-fuel ratio. That is, upon energization of the heater 35, the bellows 16 is extended, resulting in increasing the pressure difference set value. Consequently, the opening area of the variable orifice interlocked to the pressure difference setting diaphragm is increased and hence the pressure $P_n$ in the chamber C is increased to displace the diaphragm of the valve opening mechanism 3 until it is balanced at the set pressure difference which has been corrected. The flow detection valve is thus closed. At the same time, the fuel control mechanism interlocked to the flow detection valve decreases the supply of fuel to decrease the fuel proportion. In the case of an oxygen sensor utilizing the electromotive force of zirconium dioxide ($Zr\ O_2$), the electromotive force changes in a step function manner in the vicinity of the theoretical air-fuel ratio. If the fuel proportion is decreased as described above, the oxygen concentration in the exhaust gas is increased, so that the output from the sensor 33 becomes zero, deenergizing the heater 35. As a result, the bellows 16 is gradually contracted and the air-fuel ratio shifts toward the fuel-rich side, so that the sensor 33 gives its output again, thus repeating the above-described compensating action. The means for controlling the heater 35 is not limited to said exhaust gas sensor. For example, it may be controlled by a signal which simulates the operating conditions of the engine. Further, the heater 35 may be energized when the r.p.m. of the engine reaches a predetermined value.

Figure 5:
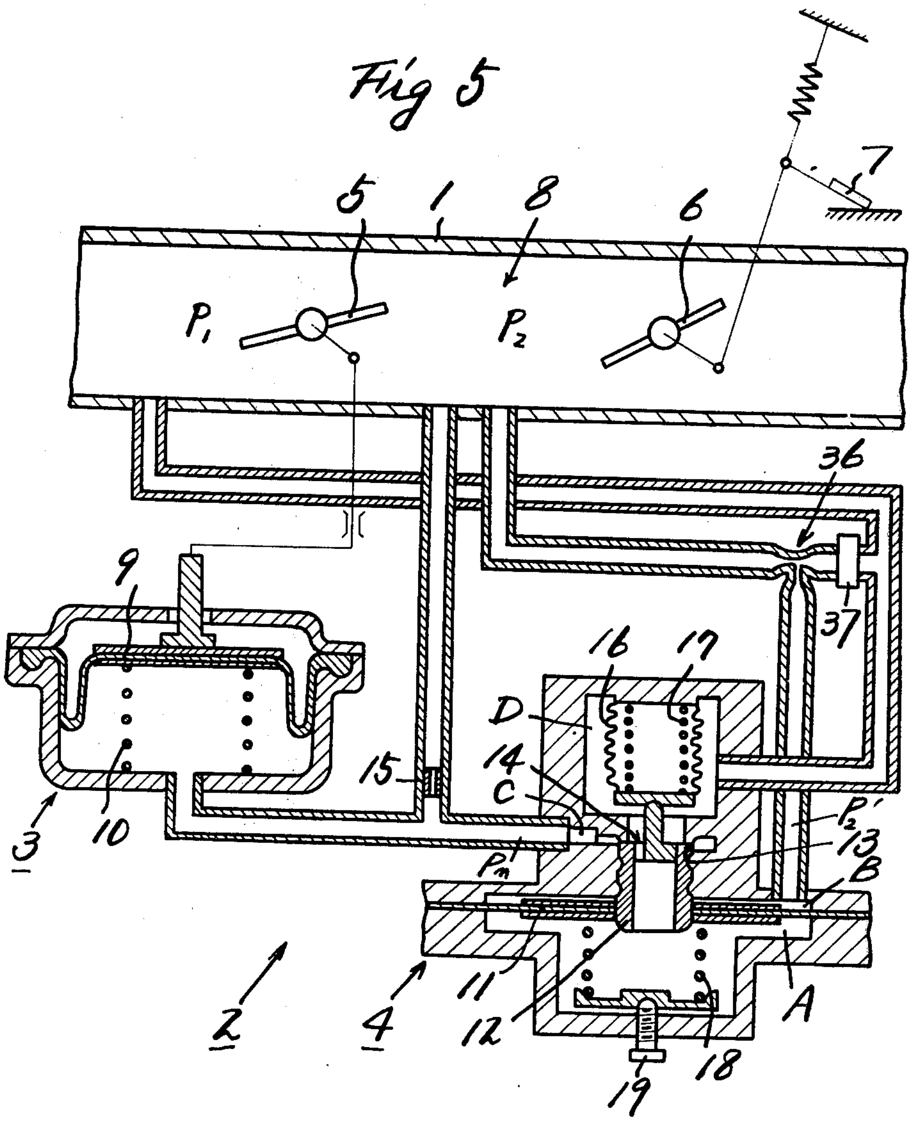
FIG. 5 shows a modification of the device shown in FIG. 4.

In the above embodiments, the system used has been one for compensating the difference pressure adjusting spring for setting the pressure difference setting diaphragm, but the compensation of air-fuel ratio may also be achieved by varying the pressures $P_1$ and $P_2$ in the suction pipe acting on opposite sides of the pressure difference setting diaphragm 11. FIG. 5 shows such embodiment, wherein the upstream side of the upstream valve 5 and the intermediate chamber 8 downstream of said valve communicate with chambers A and D through a venturi 36 and a chamber B communicates with the venturi 36 at a position where its static pressure is detected. Designated at 37 is an on-off valve which is opened when it is desired to increase the fuel proportion relative to the air when the engine is at full throttle or warming up. When the engine is at full throttle, the opening and closing of said valve 37 is effected by an electric contact set (not shown) placed on the flow control valve 5 or a pressure-sensitive switch (not shown) placed in the manifold and adapted to be closed when the negative pressure in the manifold is high, while when the engine is warming up, it is effected by an element which is sensitive to the temperature of the engine cooling water. In addition, the on-off valve 37 is kept closed during the normal engine operation, i.e., except when the engine is at full throttle or is warming up.

The principle of the operation of the above air-fuel ratio compensating mechanism is as follows.

Figures 6, 7, 9:
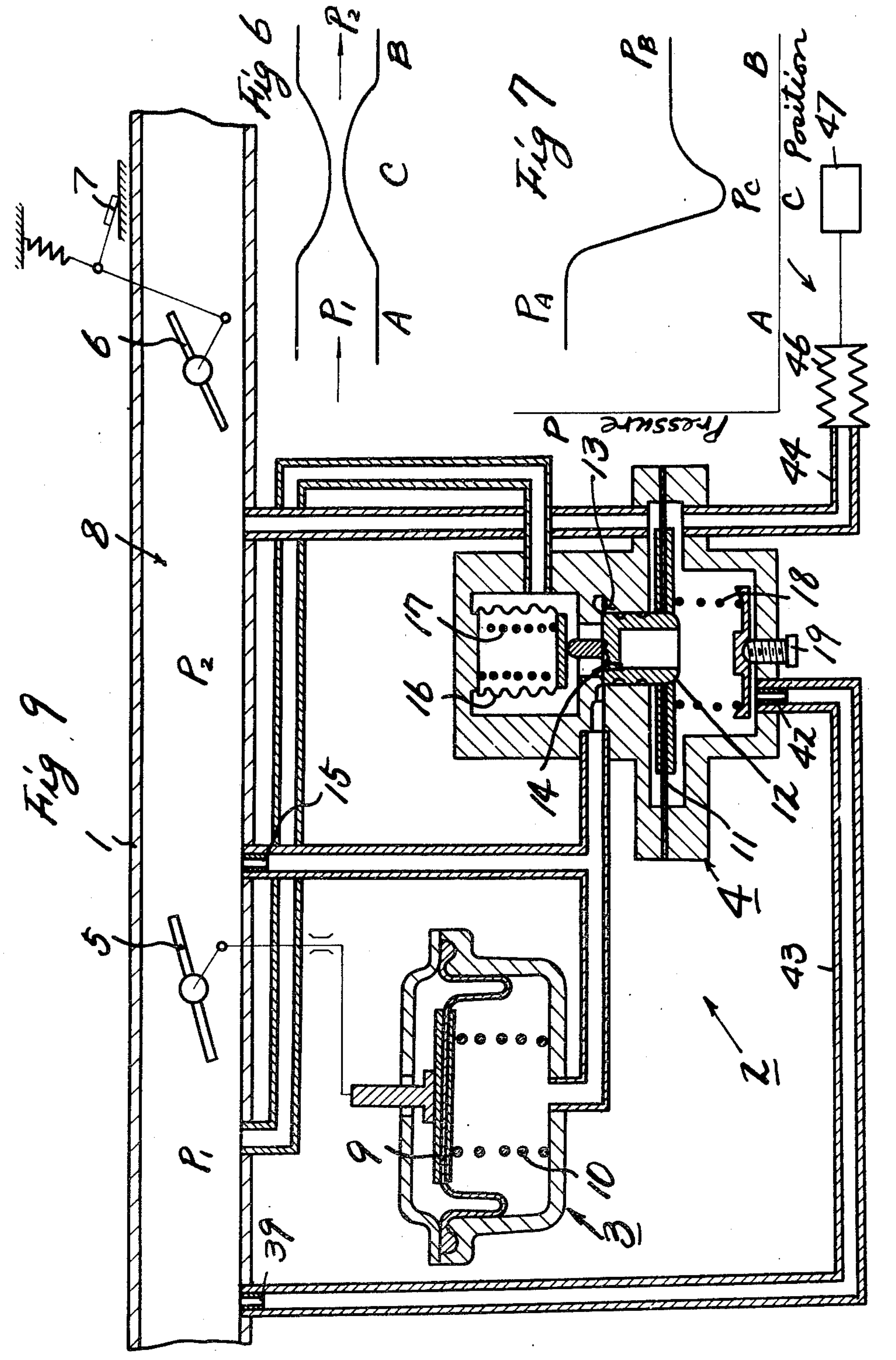
FIGS. 6 and 7 are views explanatory of the principle of operation of the device shown in FIG. 5.
FIG. 9 shows a modification of the device shown in FIG. 8.

When it is necessary to increase the fuel concentration as when the engine is warming up or is at full throttle, said electric contact set, pressure-sensitive switch or sensitive element opens the on-off vaive 37. According to Bernoulli's principle, when a high pressure source A (at pressure $P_A$) and a low pressure source B (at pressure $P_B$) are interconnected through a venturi C, as shown in FIG. 6, the pressure distribution is as shown in FIG. 7 with the pressure $P_C$ in the venturi C lower than $P_B$. Thus, the pressure in the venturi in FIG. 5 is $P_2'$ which is lower than the pressure $P_2$ in the chamber B. Since the servo-mechanism 4 is set so that the pressure difference ($P_1$ - $P_2'$) may take a particular value, the pressure difference ($P_1$ - $P_2$) between the upstream side of the upstream valve 5 and the intermediate chamber 8 downstream of said upstream valve becomes smaller by the difference between $P_2$ and $P_2'$ and the pressure difference set value becomes such a value as can be obtained by displacing the pressure difference setting diaphragm 11 upward as viewed in the figure. Since this displacement of the pressure difference setting diaphragm 11 decreases the opening area of the variable orifice 13, the pressure $P_n$ in the chamber C is decreased. At the same time, the pressure in the lower chamber of the valve opening mechanism is decreased to displace the diaphragm 9 downward as viewed in the digure to open the flow detection valve 5, so that the amount of fuel to be fed by the fuel control mechanism interlocked to the flow detection valve 5 is increased. The fuel proportion is increased in this way to increase the engine output at full throttle and facilitate engine start during warm-up.

The compensation described above may also be achieved by varying the pressure $P_1$ on the upstream side of the flow detection valve 5 according to the operating conditions of the engine and feeding it to the servo-mechanism. This will now be described with reference to FIG. 8.

The pressure $P_1$ on the upstream side of the flow detection valve 5 is fed to the chamber A of the servo-mechanism through a pipe 38. The pipe 38 branches and is bypassed to extend to the intermediate chamber 8. A fixed choke 39 is disposed in the pipe 38 on the upstream pressure $P_1$ side while a valve opening unit 40 is disposed in the bypass channel. The opening and closing of the valve opening unit 40 is controlled by a sensor 41 which detects the operating conditions of the engine.

The compensation device constructed in the manner described above operates as follows.

The pressure difference setting diaphragm 11 is preset so as to provide fuel-rich gas. When the valve opening unit 40 is opened by a signal simulating the operating conditions of the engine or the output from the sensor 41, a bypass circuit having the choke 39 is made up between the upstream side of the flow detection valve 5 and the intermediate chamber 8. As a result, the pressure $P_1$ acting inside the chamber A is decreased and becomes $P_1'$, so that the set pressure difference is decreased. The decrease of the set pressure difference causes the pressure difference setting diaphragm 11 to be balanced at a downwardly displaced position, so that the opening area of the variable orifice 13 is increased, whereupon the pressure $P_2$ in the chamber C is increased to upwardly displace the diaphragm 9 of the valve opening device 3. Along with this, the flow detection valve 5 is balanced at a position where it is closed more than before. Eventually, the supply of fuel to the engine is decreased, so that the air-fuel ratio shifts toward the fuel-lean side. When the output from the sensor disappears, the valve opening unit 40 is closed. As a result, $P_1$ is increased and the air-fuel ratio shifts toward the fuel-rich side. This operation is repeated in this way, whereby the air-fuel ratio is controlled so as to be optimum. In addition, the bypass circuit has been shown as connected to the intermediate chamber 8, but the same result may also be obtained even if it is connected to the downstream side of the flow control valve 6.

Figure 8:
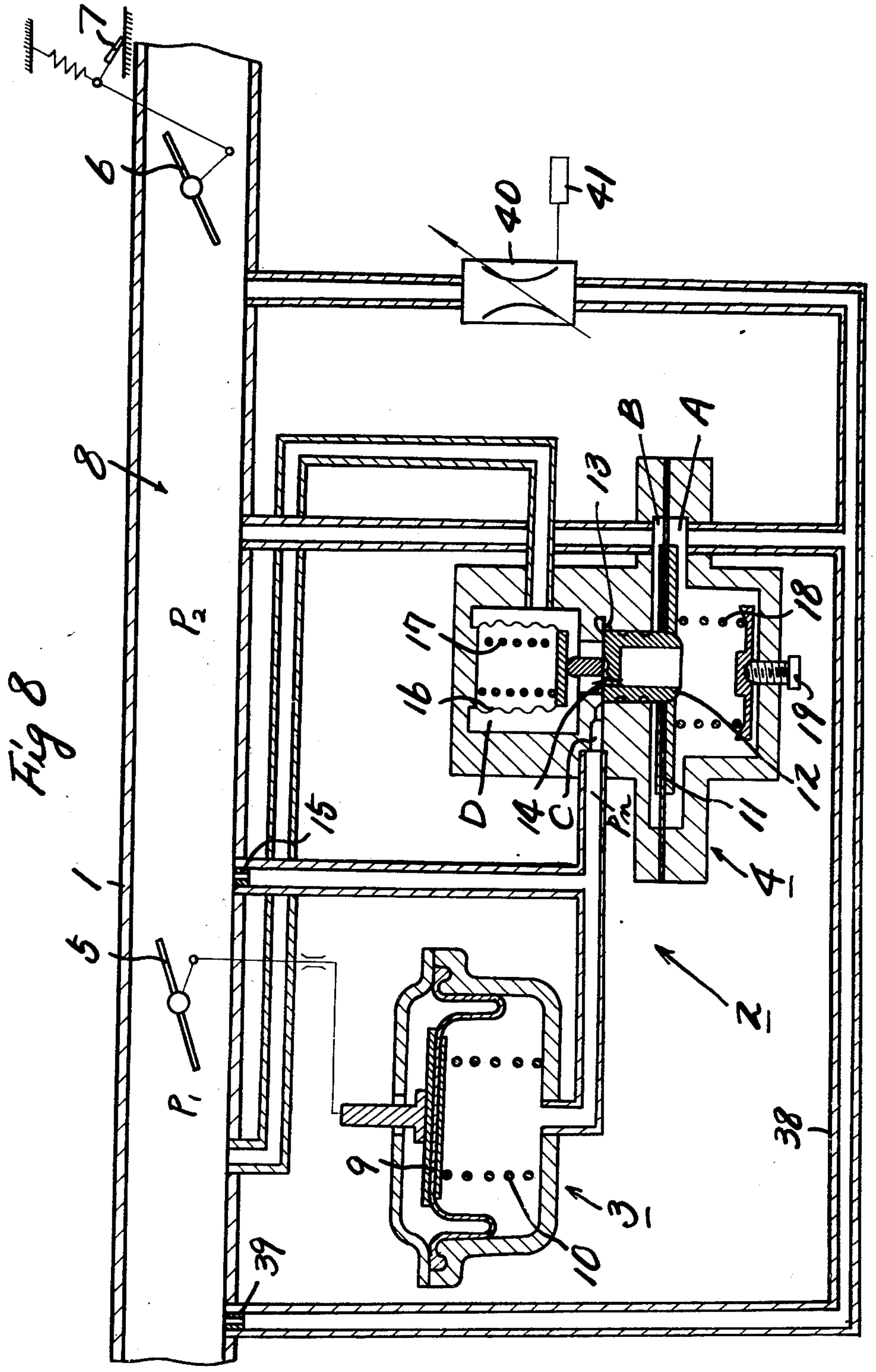
FIG. 8 is view explanatory of a third embodiment of the invention.

FIG. 9 shows a modification of the device shown in FIG. 8. The pressure $P_1$ on the upstream of the flow detection valve 5 acts on the chamber A of the servo-mechanism through a pipe 43 having a fixed choke 42. The chamber A is connected to a compensation mechanism 45 through a pipe 44. The compensation mechanism 45 consists of a bellows 46 which sucks and discharges the fluid in the chamber A, and a controller 47 which drives the bellows 46. The controller 47 of the compensation mechanism 45 produces signals according to the operating conditions of the engine to drive the bellows 46. If the fluid in the chamber A is sucked into the bellows 46, the pressure $P_1$ in the chamber A is decreased, resulting in shifting the air-fuel ratio toward the fuel-lean side. If the fluid in the chamber A is discharged, the pressure in the chamber A temporarily rises for the time the fluid leaks through the fixed choke 42. Eventually, the air-fuel ratio shifts toward the fuel-rich side.

The use of the air-fuel ratio compensating mechanism described above is not limited to the servo-mechanism 4, and it may also be used with the usual area flowmeter type internal combustion engine air weight measuring device. Further, it is also applicable to the pressure difference setting spring in the pressure difference error detecting and amplifying section in the servo-mechanism.

While there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

We claim:

1. In an internal combustion engine having a fuel control unit, an air suction pipe means, and pedal accelerator means, the improvement of an air fuel ratio compensating device for improving the performance of the engine, said compensating device comprising a flow detection valve positioned upstream in the air suction pipe means and operatively associated with the fuel control unit, a flow control valve positioned downstream in the air suction pipe means and in series with said flow detection valve, said flow control valve being operatively connected to the accelerator pedal means, said flow detection valve and said flow control valve constituting an area flow meter system whereby the difference in pressure existing on opposite sides of the flow detection valve may be maintained at a predetermined value to insure that the amount of air flow is proportional to the opening area of the flow detection valve thereby permitting a determination of the amount of air flow on basis of the opening area of the flow detection valve, a feedback control mechanism for controlling said area flow meter, said control mechanism including pressure-sensitive amplifier means for detecting and amplifying the deviation of the difference in pressure and valve opening means connected to said amplifier means and operatively associated with said flow detection valve for contolling the opening and closing of said detection valve by the output from said amplifier means, and compensating means for compensating for the set value placed in the pressure-sensitive amplifier means according to the operating conditions of the internal combustion engine, said compensating means actuatable by the temperature of the cooling water of the engine.

2. In an internal combustion engine having a fuel control unit, an air suction pipe means, and pedal accelerator means, the improvement of an air fuel ratio compensating device for improving the performance of the engine, said compensating device comprising a flow detection valve positioned upstream in the air suction pipe means and operatively associated with the fuel control unit, a flow control valve positioned downstream in the air suction pipe means and in series with said flow detection valve, said flow control valve being operatively connected to the accelerator pedal means, said flow detection valve and said flow control valve constituting an area flow meter system whereby the difference in pressure existing on opposite sides of the flow detection valve may be maintained at a predetermined value to insure that the amount of air flow is proportional to the opening area of the flow detection valve thereby permitting a determination of the amount of air flow on basis of the opening area of the flow detection valve, a feedback control mechanism for controlling said area flow meter, said control mechanism including pressure-sensitive amplifier means for detecting and amplifying the deviation of the difference in pressure and valve opening means connected to said amplifier means and operatively associated with said flow detection valve for controlling the opening and closing of said detection valve by the output from said amplifier means, said feedback control mechanism including a pressure difference setting diaphragm actuating the amplifier means, and compensating means for compensating for the set value placed in the pressure-sensitive amplifier means according to the operating conditions of the internal combustion engine, said compensating means including a pressure difference setting spring operatively connected with said pressure difference setting diaphragm to achieve the desired compensation for the set value placed in the pressure-sensitive amplifier means according to the operating conditions of the engine, said compensating means further including a connecting bar connected to the lower end of the pressure difference setting spring, a magnetic body fixed to one end of said connecting bar, and an electromagnetic coil disposed around the connecting bar, said electromagnetic coil being adapted to be energized and de-energized according to the operating conditions of the internal combustion engine.

3. In an internal combustion engine having a fuel control unit, an air suction pipe means, and pedal accelerator means, the improvement of an air fuel ratio compensating device for improving the performance of the engine, said compensating device comprising a flow detection valve positioned upstream in the air suction pipe means and operatively associated with the fuel control unit, a flow control valve positioned downstream in the air suction pipe means and in series with said flow detection valve, said flow control valve being operatively connected to the accelerator pedal means, said flow detection valve and said flow control valve constituting an area flow meter system whereby the difference in pressure existing on opposite sides of the fow detection valve may be maintained at a predetermined value to insure that the amount of air flow is proportional to the opening area of the flow detection valve thereby permitting a determination of the amount of air flow on basis of the opening area of the flow detection valve, a feedback control mechanism for controlling said area flow meter, said control mechanism including pressure-sensitive amplifier means for detecting and amplifying the deviation of the difference in preossure and valve opening means connected to said amplifier means and operatively associated with said flow detection valve for controlling the opening and closing of said detection valve by the output from said amplifier means, said feedback control mechanism including a pressure difference setting diaphragm actuating the amplifier means, and compensating means for compensating for the set value placed in the pressure-sensitive amplifier means according to the operating conditions of the internal combustion engine, said compensating means including a pressure difference setting spring operatively connected with said pressure difference setting diaphragm to achieve the desired compensation for the set value placed in the pressure-sensitive amplifier means according to the operating conditions of the engine, said compensating means further including a connecting bar connected to the bottom of the pressure difference setting spring of the pressure difference setting diaphragm, a lever for displacing said connecting bar, a piston for downwardly pressing one end of said lever, a cylinder receiving said piston, a temperature-sensitive member for sensing the temperature of the cooling water of the cooling water of the engine, and a fluid enclosed in said temperature-sensitive member whereby the enclosed fluid is expanded and contracted depending upon the temperature of cooling water to compensate the force of said pressure difference setting spring.

* * * * *